United States Patent
Park et al.

(10) Patent No.: US 8,174,505 B2
(45) Date of Patent: May 8, 2012

(54) TOUCH SCREEN DISPLAY DEVICE AND DRIVING METHOD OF THE SAME

(75) Inventors: Jong-Woung Park, Seongnam-si (KR); Sung-Woo Lee, Suwon-si (KR); Kee-Han Uh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 470 days.

(21) Appl. No.: 12/470,112

(22) Filed: May 21, 2009

(65) Prior Publication Data

US 2010/0020029 A1  Jan. 28, 2010

(30) Foreign Application Priority Data

Jul. 28, 2008  (KR) ........................ 10-2008-0073557

(51) Int. Cl.
*G06F 3/041* (2006.01)
(52) U.S. Cl. ...................... 345/173; 345/174; 178/18.01
(58) Field of Classification Search .......... 345/173–178; 178/18.01–18.11
See application file for complete search history.

(56) References Cited

U.S. PATENT DOCUMENTS

| | | | | |
|---|---|---|---|---|
| 6,888,536 B2 * | 5/2005 | Westerman et al. | ........... | 345/173 |
| 7,864,161 B2 * | 1/2011 | Hollemans et al. | ............ | 345/173 |
| 2005/0046621 A1 * | 3/2005 | Kaikuranta | .................. | 345/173 |
| 2006/0244735 A1 * | 11/2006 | Wilson | ........................... | 345/173 |
| 2008/0100590 A1 * | 5/2008 | Hur et al. | ....................... | 345/173 |
| 2008/0309630 A1 * | 12/2008 | Westerman | .................... | 345/173 |
| 2008/0309632 A1 * | 12/2008 | Westerman et al. | .......... | 345/173 |
| 2008/0309639 A1 * | 12/2008 | Wei et al. | ....................... | 345/173 |
| 2009/0009488 A1 * | 1/2009 | D'Souza et al. | .............. | 345/177 |
| 2009/0090567 A1 * | 4/2009 | Tonouchi | ................... | 178/18.03 |
| 2010/0097342 A1 * | 4/2010 | Simmons et al. | ............. | 345/174 |
| 2010/0193258 A1 * | 8/2010 | Simmons et al. | .......... | 178/18.06 |
| 2010/0309139 A1 * | 12/2010 | Ng | ................................ | 345/173 |

* cited by examiner

*Primary Examiner* — Amare Mengistu
*Assistant Examiner* — Premal Patel
(74) *Attorney, Agent, or Firm* — H.C. Park & Associates, PLC

(57) ABSTRACT

A touch screen display device and a driving method of the same are provided. The touch screen display device includes a touch screen display panel including a plurality of first sensing lines that extend in a first direction, a plurality of second sensing lines that extend in a second direction and cross the first direction, and a plurality of touch sensing elements respectively arranged at areas where the first sensing lines and the second sensing lines cross each other; and a read-out unit that receives output signals of the respective first sensing lines and second sensing lines, reading at least one sensing position, and outputting one of the at least one read sensing positions as a touch position, wherein if the number of sensing positions of the current frame is equal to or greater than two, the read-out unit compares the at least two sensing positions of the current frame with a touch position of the previous frame, and outputs the sensing position that is closest to the touch position of the previous frame as a touch position of the current frame.

19 Claims, 7 Drawing Sheets

FIG. 9

TOUCH SCREEN DISPLAY DEVICE AND DRIVING METHOD OF THE SAME

CROSS-REFERENCE TO RELATED APPLICATION

This application claims priority from and the benefit of Korean Patent Application No. 10-2008-0073557, filed on Jul. 28, 2008, which is hereby incorporated by reference for all purposes as if fully set forth herein.

BACKGROUND OF THE INVENTION

1. Field of the Invention

The present invention relates to a touch screen display device, and more particularly, to a touch screen display device having improved reliability and a driving method of the same.

2. Discussion of the Background

A touch screen display device is a display device having a touch screen function and allowing a user to directly touch an arbitrary position by a finger on the touch screen display device to enter a desired operation command.

A display device having a touch screen function may be widely used because it is provided with an intuitive interface allowing a user to easily enter information. The display device may include a plurality of pixels for displaying images and a plurality of touch sensing elements for sensing a user's touched positions.

Gate signals and data signals may be applied to the respective pixels, and the respective touch sensing elements generate output signals according to the presence or absence of an external touch. Accordingly, the display device may require a gate driver and a data driver for applying gate signals and data signals, respectively, and a read-output unit for reading signals output from the respective touch sensing elements.

SUMMARY OF THE INVENTION

The present invention provides a touch screen display device having improved reliability.

The present invention also provides a driving method of a touch screen display device having improved reliability.

Additional features of the invention will be set forth in the description which follows, and in part will be apparent from the description, or may be learned by practice of the invention.

The present invention discloses a touch screen display device including a touch screen display panel, which includes a plurality of first sensing lines that extend in a first direction, a plurality of second sensing lines that extend in a second direction and cross the first direction, and a plurality of touch sensing elements respectively arranged at intersection areas where the first sensing lines and the second sensing lines cross each other, and a read-out unit that receives output signals of the respective first sensing lines and second sensing lines, reads at least one sensing position, and outputs one of the at least one read sensing positions as a touch position, wherein if the number of sensing positions of the current frame is equal to or greater than two, the read-out unit compares the at least two sensing positions of the current frame with a touch position of the previous frame, and outputs the sensing position that is closest to the touch position of the previous frame as a touch position of the current frame.

The present invention also discloses a method of driving a touch screen display device, which includes providing a touch screen display panel that includes a plurality of first sensing lines that extend in a first direction, a plurality of second sensing lines that extend in a second direction and cross the first direction, and a plurality of touch sensing elements respectively formed at intersection areas where the first sensing lines and the second sensing lines cross each other; receiving output signals of the respective first sensing lines and second sensing lines and reading at least one sensing position; and outputting one of the at least one read sensing positions as a touch position; wherein if the number of sensing positions of the current frame is equal to or greater than two, the at least two sensing positions of the current frame are compared with the touch position of the previous frame, and the sensing position that is closest to a touch position of the previous frame is output as a touch position of the current frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Spatially relative terms, such as "below", "beneath", "lower", "above", "upper" and the like, may be used herein for ease of description to describe one element or feature's relationship to another element(s) or feature(s) as illustrated in the figures. It will be understood that spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
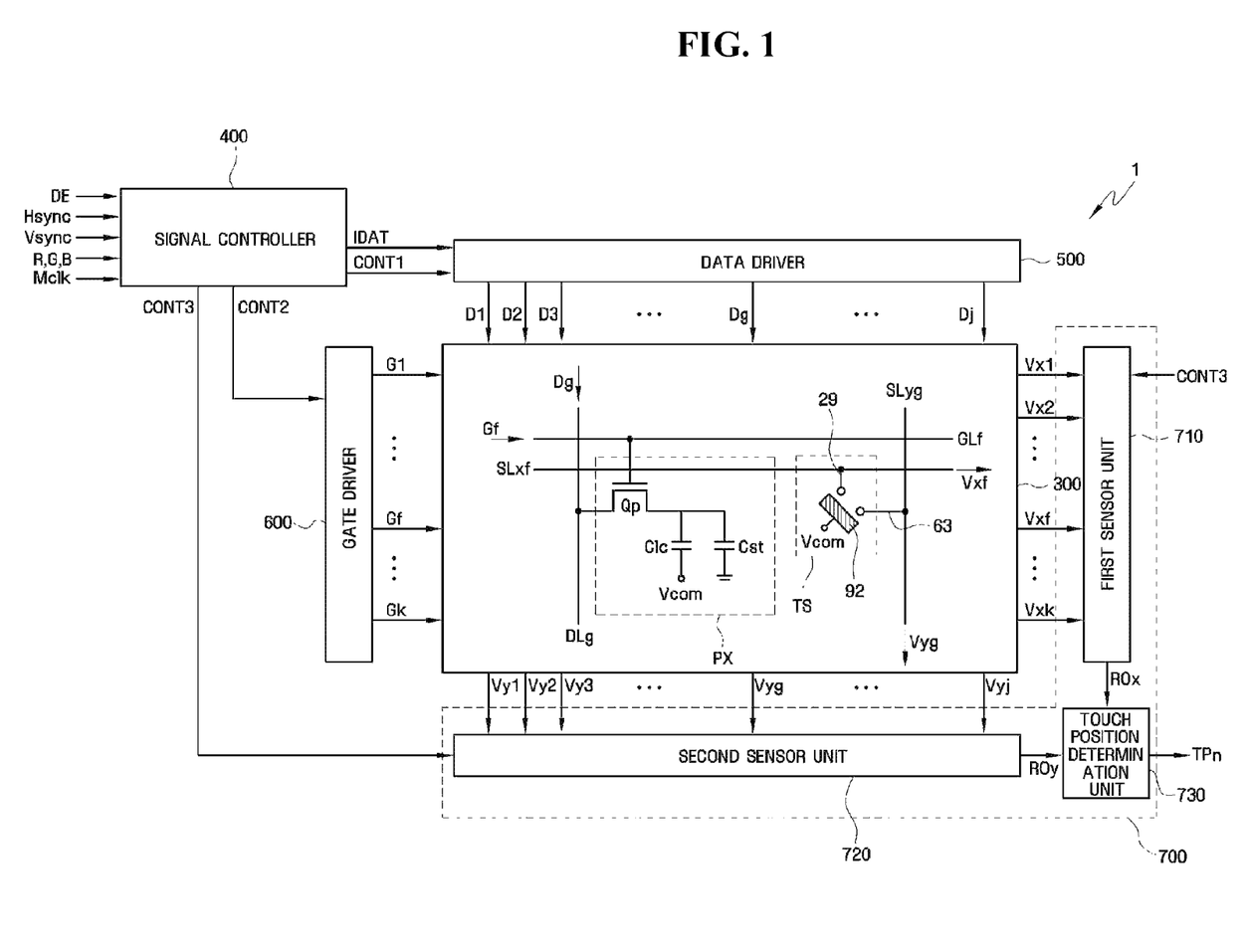
FIG. 1 a block diagram showing a touch screen display device according to an exemplary embodiment of the present invention and a driving method of the touch screen display device.

A touch screen display device according to an exemplary embodiment of the present invention and a driving method of the touch screen display device will be described with reference to FIG. 1. FIG. 1 is a block diagram showing a touch screen display device 1 according to an exemplary embodiment of the present invention and a driving method of the touch screen display device.

Referring to FIG. 1, the touch screen display device 1 includes a touch screen display panel 300, a signal controller 400, a gate driver 600, a data driver 500, and a read-out unit 700.

The touch screen display panel 300 includes first sensing lines SLx1-SLxk (not shown) extending in a first direction, second sensing lines SLy1-SLyj (not shown) extending in a second direction that is substantially perpendicular to the first direction, and a plurality of touch sensing elements TS formed at areas where the first sensing lines SLx1-SLxk and the second sensing lines SLy1-SLyj cross each other.

In addition, the touch screen display panel 300 includes a plurality of gate lines GL1-GLk (not shown) extending in a direction substantially parallel to the first direction, a plurality of data lines DL1-DLj (not shown) extending in a direction substantially parallel to the second direction, and a plurality of pixels PX defined by the respective gate lines GL1-GLk and the respective data lines DL1-DLj in a matrix form.

The gate lines GL1-GLk receive respective gate signals G1-Gk from the gate driver 600, and the data lines DL1-DLj receive respective image data voltages D1-Dj from the data driver 500. The first and second sensing lines SLx1-SLxk and SLy1-SLyj supply output signals Vx1-Vxk and Vy1-Vyj to the read-out unit 700, respectively.

FIG. 1 shows an fth gate line GLf (f=1~k), a gth data line DLg (g=1~j), and a pixel PX defined at a crossing area of the fth gate line GLf and the gth data line DLg, as well as a fth first sensing line SLxf (f=1~k), a gth second sensing line SLyg (g=1~j), and a touch sensing element TS defined at a crossing area of the fth first sensing line SLxf and the gth second sensing line SLyg. The plurality of gate lines GL1-GLk, the plurality of data lines DL1-DLj, the plurality of pixels PX, the plurality of first sensing lines SLx1-SLxk, the plurality of second sensing lines SLy1-SLyj, and the plurality of touch sensing elements TS will be shown by way of examples.

Referring to FIG. 1, which shows an equivalent circuit diagram, a pixel PX includes a switching element Qp connected to the fth gate line GLf and the gth data line DLg, and a liquid crystal capacitor Clc and a storage capacitor Cst connected to the switching element Qp. The liquid crystal capacitor Clc may have a common voltage Vcom at its second end and the storage capacitor Cst may be connected to a ground terminal at its second end.

Referring to FIG. 1, a touch sensing element TS includes a first sensor electrode 29 extending from the first sensing line SLxf, a second sensor electrode 63 extending from the second sensing line SLyg, and a sensor spacer 92 connected to the first sensor electrode 29 and the second sensor electrode 63 in response to an external contact. Here, the sensor spacer 92 may have a common voltage Vcom. Accordingly, if the sensor spacer 92 comes into contact with the first sensor electrode 29 and the second sensor electrode 63 by an external stimulus, e.g., an external touch, the first sensing line SLxf and the second sensing line SLyg may have output signals supplied with a predetermined level of a common voltage Vcom.

The signal controller 400 receives first image signals R, G, and B and outputs second image signals IDAT corresponding to the received first image signals R, G, and B. In addition, the signal controller 400 receives external control signals Vsync, Hsync, Mclk, and DE and generates a data control signal CONT1 and a gate control signal CONT2. Examples of the external control signals Vsync, Hsync, Mclk, and DE include a vertical synchronization signal Vsync, a horizontal synchronization signal Hsync, a main clock signal Mclk, and a data enable signal DE. The gate control signal CONT2 controls the operation of the gate driver 600 while the data control signal CONT1 controls the operation of the data driver 500.

The signal controller 400 also generates a touch sensing control signal CONT3, and supplies the same to a first sensor unit 710 and a second sensor unit 720. Examples of the touch sensing control signal CONT3 include a loading signal (not shown), and a shift clock signal (not shown).

The gate driver 600, provided with the gate control signal CONT2 from the signal controller 400, applies the gate signals G1-Gk to the gate lines GL1-GLk. Here, the gate control signal CONT2 for controlling the operation of the gate driver 600 includes a vertical synchronization start signal instructing start of the operation of the gate driver 600, a gate clock signal controlling an output timing of the gate on signal, an output enable signal that determines the duration of the gate-on voltage Von, etc. The gate signals G1-Gk are composed of a combination of a gate-on voltage Von and a gate-off voltage Voff, which are generated from a gate on/off voltage generator (not shown).

The data driver 500 receives the data control signal CONT1 from the signal controller 400 and applies the image signal voltage D1-Dj corresponding to the second image signal IDAT to the data lines DL1-DLj. Here, the data control signal CONT1 includes signals for controlling the operation of the data driver 500. The signals for controlling the operation of the data driver 500 include a horizontal synchronization start signal for starting the operation of the data driver 500, an output enable signal for determining the output of an image data voltage D1-Dj, etc.

The read-out unit 700 may include a first sensor unit 710, a second sensor unit 720, and a touch position determination unit 730. The first sensor unit 710 senses first active lines among the plurality of first sensing lines SLx1-SLxk, the first active lines corresponding to positions of external stimuli. The second sensor unit 720 senses second active lines among the plurality of second sensing lines SLy1-SLyj, the second active lines corresponding to positions of external stimuli. The touch position determination unit 730 determines a touch position TP based on the first and second active lines. The sensing positions sensed by the read-out unit 700 as touch positions are corresponding combinations of the first and second active lines.

The first sensor unit 710 receives output signals Vx1-Vxk of the respective first sensing lines SLx1-SLxk and recognizes the first active lines corresponding to the positions of external stimuli. The first sensor unit 710 recognizes at least one first active line and outputs a first read-out signal ROx. Although not shown, the first sensor unit 710 operates upon the receipt of a reference voltage Vref and a reset voltage Vrst, which are externally supplied.

Similarly, the second sensor unit 720 receives output signals Vy1-Vyj of the respective second sensing lines SLy1-SLyj and recognizes the second active lines corresponding to the positions of external stimuli. That is, the second sensor unit 720 recognizes at least one second active line and outputs a second read-out signal ROy. Although not shown, the second sensor unit 720 may operate upon the receipt of a reference voltage Vref and a reset voltage Vrst, which are externally supplied.

The first and second sensor units 710 and 720 may be implemented into a single chip together with the gate driver 600 and the data driver 500. Further, the first and second sensor units 710 and 720 implemented into a single chip may be driven independent of the gate driver 600 and the data driver 500.

The touch position determination unit 730 receives the first and the second read-out signals ROx and ROy, recognizes one or more sensing positions of the current frame using the first and second active lines, and outputs one of the recognized one or more sensing positions as a touch position TPn of the current frame. The touch position determination unit 730 will be described in more detail below.

Figure 2:
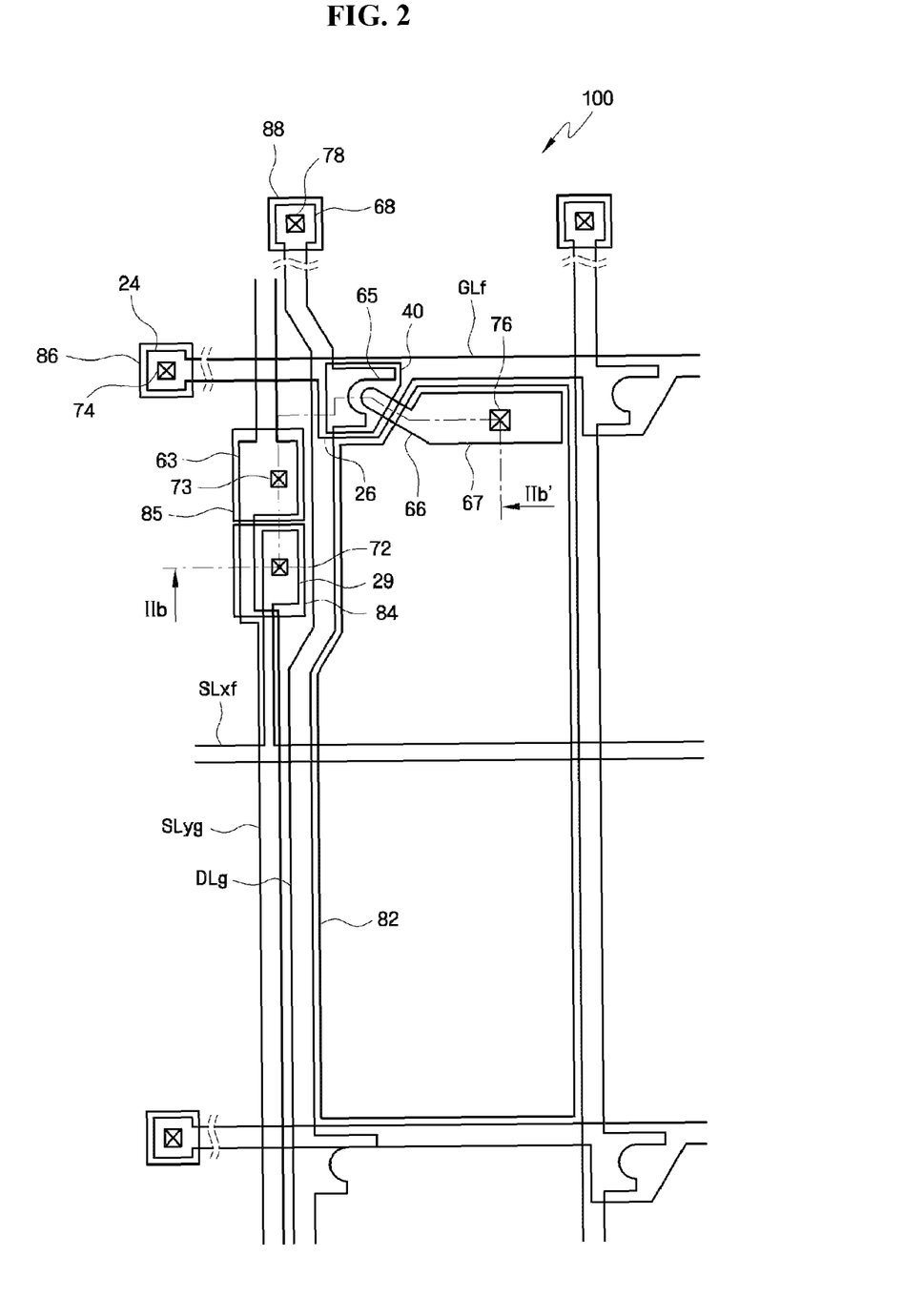
FIG. 2 is a layout of a first substrate included in a touch screen display panel shown in FIG. 1.
Figure 3:
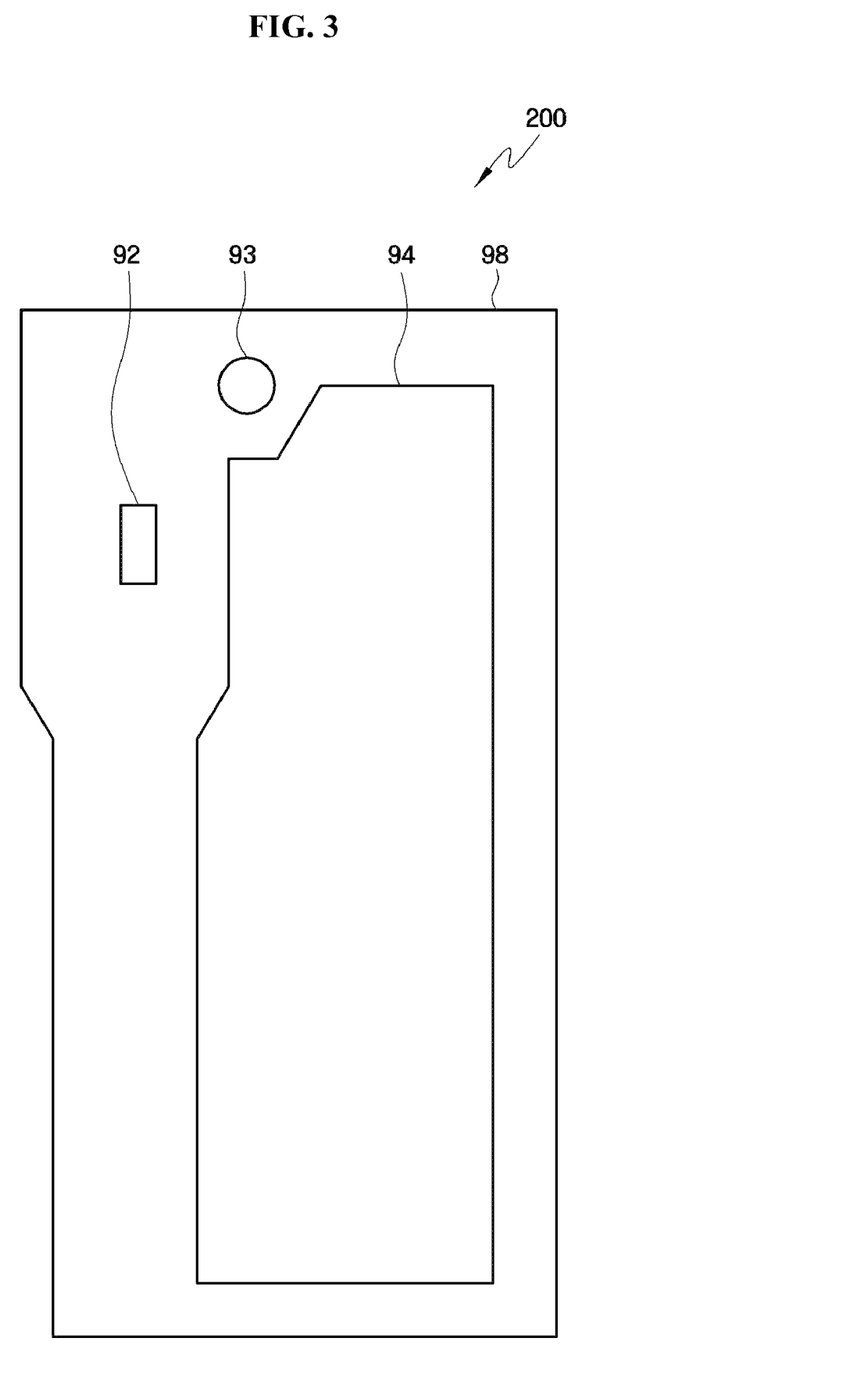
FIG. 3 is a layout of a second substrate included in a touch screen display panel shown in FIG. 1.
Figure 4:
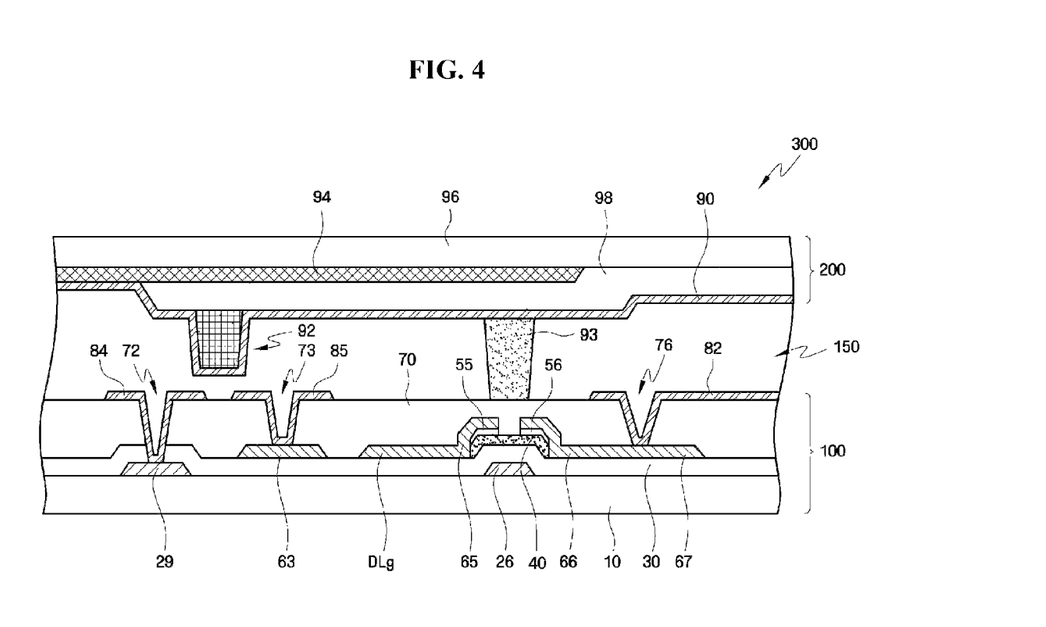
FIG. 4 is a cross-sectional view of the touch screen display panel shown in FIG. 1, along line IIb-IIb' in FIG. 2.
Figure 5:
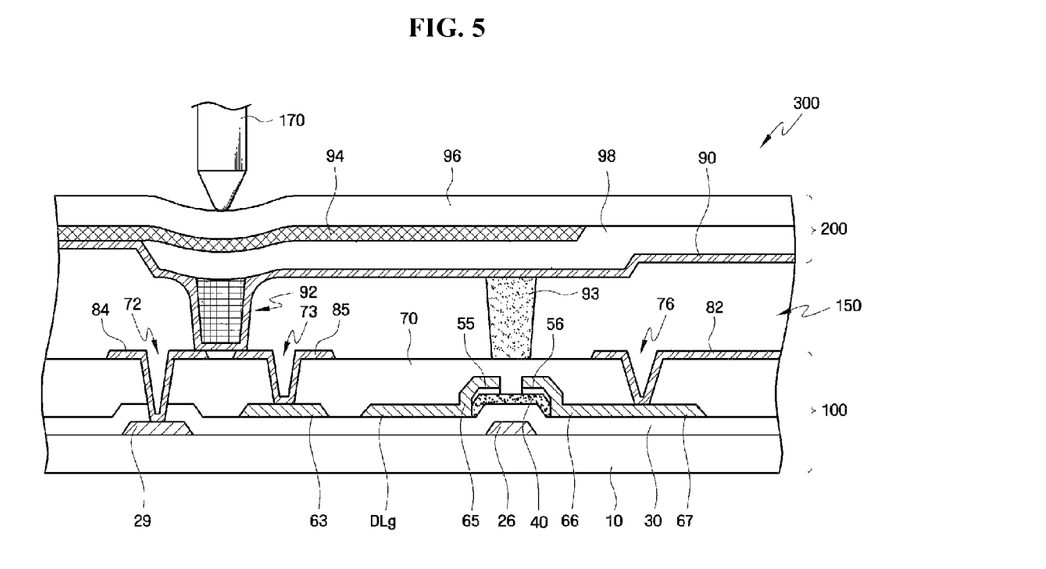
FIG. 5 is a cross-sectional view showing a process of entering position information by touching a particular position on the touch screen display panel shown in FIG. 4.

The touch screen display panel 300 shown in FIG. 1 will be described in greater detail with reference to FIG. 2, FIG. 3, FIG. 4, and FIG. 5. FIG. 2 is a layout of a first substrate 100 included in a touch screen display panel 300 shown in FIG. 1, FIG. 3 is a layout of a second substrate 200 included in the touch screen display panel 300 shown in FIG. 1, FIG. 4 is a cross-sectional view of the touch screen display panel shown in FIG. 1, along line IIb-IIb' in FIG. 2, and FIG. 5 is a cross-sectional view showing a process of entering position information by touching a particular position on the touch screen display panel 300 shown in FIG. 4.

The touch screen display panel 300 includes a first substrate (100 of FIG. 4) having a plurality of gate lines GL1-GLk, a plurality of data lines DL1-DLj, a plurality of pixels PX, a plurality of first sensing lines SLx1-SLxk, and a plurality of second sensing lines SLy1-SLyj, a second substrate (200 of FIG. 4) facing the first substrate 100 and having a common electrode (90 of FIG. 4) and a sensor spacer (92 of FIG. 4), and a liquid crystal molecule layer (150 of FIG. 4) disposed between the first and second substrates 100 and 200.

The first substrate 100 will first be described with reference to FIG. 2 and FIG. 4. A gate electrode 26 in the form of a protrusion is formed on the gate line GLf disposed on an insulating substrate 10 in a first direction. A gate line end portion 24 is formed at an end of the gate line GLf to receive a gate signal (Gf of FIG. 1) from the outside and transmit the received gate signal Gf to the gate line GLf.

In addition, a first sensing line SLxf is formed on the insulating substrate 10. It is spaced apart from the gate line GLf and substantially parallel with the first direction. Further, a first sensor electrode 29, which has an expanded width, extends from the first sensing line SLxf in the form of a protrusion. The first sensor electrode 29 comprises one terminal of a touch sensing element (TS of FIG. 1) and is electrically connected to the first sensor pad 84 through a contact hole 72. When an external pressure is applied to the panel in the vicinity of the first sensor pad 84, the first sensor electrode 29 is electrically connected to the common electrode 90 on the sensor spacer 92 to provide position information corresponding to the position at which the external pressure is applied.

A gate insulating layer 30 is formed on the gate line GLf, the gate line end portion 24, the gate electrode 26, the first sensing line SLxf and the first sensor electrode 29. An active layer 40 is formed on the gate insulating layer 30, and ohmic contact layers 55 and 56 are formed on the active layer 40.

A data line DLg and a drain electrode 66 are formed on the ohmic contact layers 55 and 56 and the gate insulating layer 30. The data line DLg extends in the second direction in the figures to cross the gate line GLf. A source electrode 65 extends over the active layer 40 in the second direction as a branch of the data line DLg. A data line end portion 68 is formed at one end of the data line DLg to receive an image data voltage (Dg of FIG. 1) from the outside and to transmit the same to the data line DLg. The drain electrode 66 is spaced apart from the source electrode 65 and is located on the active layer 40 so as to face the source electrode 65 at the opposite side of the gate electrode 26. The drain electrode 66 comprises a drain electrode extension 67 that has a wide area where a contact hole 76 is located.

The second sensor line SLyg may be formed on the gate insulating layer 30. The second sensor line SLyg is separate from the data line DLg and is substantially parallel with the second direction. The second sensor electrode 63 protrudes from the second sensor line SLyg and has an extended width. Here, the second sensor electrode 63 functions as a terminal of the touch sensing element (TS of FIG. 1) and is connected to the second sensor pad 85 through the contact hole 73. Upon receiving an external pressure, the second sensor electrode 63 is connected to the common electrode 90 on the sensor spacer 92, and information corresponding to the location at which the external pressure is applied to the display is provided.

The source electrode 65 has at least a portion overlapping the active layer 40, and the drain electrode 66 faces the source electrode 65 about the gate electrode 26 and has at least a portion overlapping the active layer 40. Here, the ohmic contact layers 55 and 56 are disposed between the active layer 40 and the source electrode 65, and between the active layer 40 and the drain electrode 66, to reduce the contact resistance therebetween.

A passivation layer 70, which is made of an insulating film, is formed on the data line DLg, the source electrode 65, the drain electrode 66, the data line expansion 67, the data line end portion 68, the second sensor electrode 63, the second sensing lines SLyg, and the exposed active layer 40.

Contact holes 73, 76, and 78, which expose the second sensor electrode 63, the drain electrode 66, and the data line end portion 68, respectively, are formed in the passivation layer 70. Contact holes 72 and 74, which expose the first sensor electrode 29 and the gate line end portion 24, respectively, are formed in the passivation layer 70 and the gate insulating layer 30. A pixel electrode 82, which is electrically connected to the drain electrode 66 via the contact hole 76, is formed on the passivation layer 70 according to a pixel shape. In addition, a gate line pad 86 and a data line pad 88 are formed on the passivation layer 70 such that they are electrically connected to the gate line end portion 24 and the data line end portion 68 through the contact holes 74 and 78, respectively. Further, the first sensor pad 84 and the second sensor pad 85 are formed on the passivation layer 70 such that they are electrically connected to the first sensor electrode 29 and the second sensor electrode 63 through the contact holes 72 and 73, respectively.

Next, the second substrate 200 will be described with reference to FIG. 3 and FIG. 4. A black matrix 94 for blocking light leakage, and a color filter 98 disposed on an exemplary pixel is formed on an insulating substrate 96. A sensor spacer 92 is formed on the color filter 98. In the exemplary embodiment shown, the sensor spacer 92 may be formed as part of the color filter 98. The common electrode 90, which may be made of a transparent conductive material, is formed on the black matrix 94, the color filter 98, and the sensor spacer 92. In addition, a support spacer 93 is formed on the common electrode 90. The support spacer 93 maintains a specific gap between the first substrate 100 and the second substrate 200, thereby forming a predetermined cell gap.

Next, a process of entering position information by touching a particular position on the touch screen display panel 300 will be described with reference to FIG. 4 and FIG. 5.

In an initial state where there is no external pressure applied, that is, in the absence of an electric field, the sensor spacer 92 is separated from the first substrate 100. However, upon receiving an external pressure, the common electrode 90 provided on the sensor spacer 92 contacts the first sensor pad 84 and the second sensor pad 85, thereby connecting the common electrode 90, the first sensor pad 84, and the second sensor pad 85. That is to say, as shown in FIG. 5, if a user touches a particular position with a finger, a pen 170, or the like, the common electrode 90 on the sensor spacer 92 is connected with the first and the second sensor pads 84 and 85 on the first substrate 100 at the particular position, and a position information signal corresponding to the particular position is generated.

Figure 6:
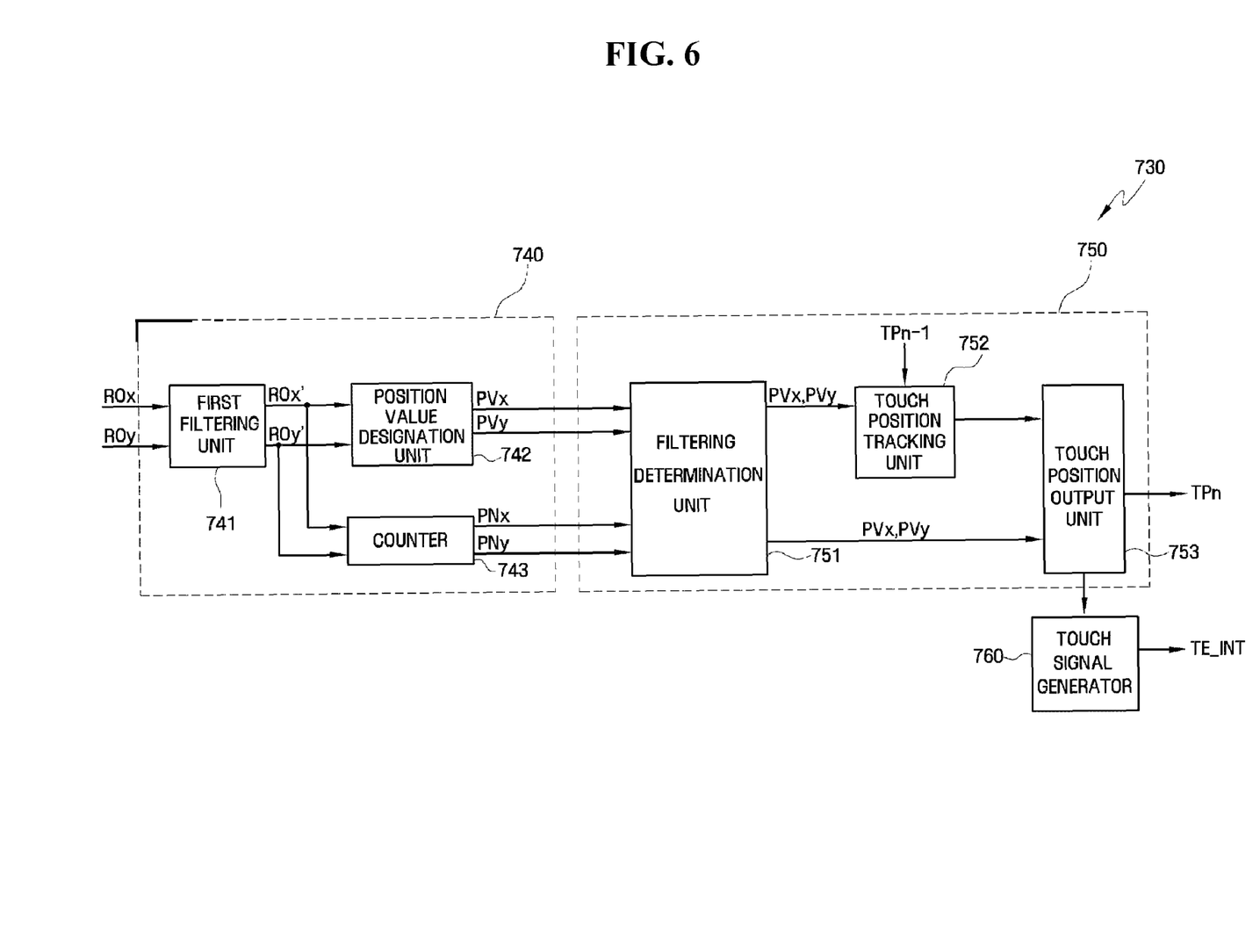
FIG. 6 is a block diagram of a touch position determination unit included in the touch screen display panel shown in FIG. 1.
Figure 7:
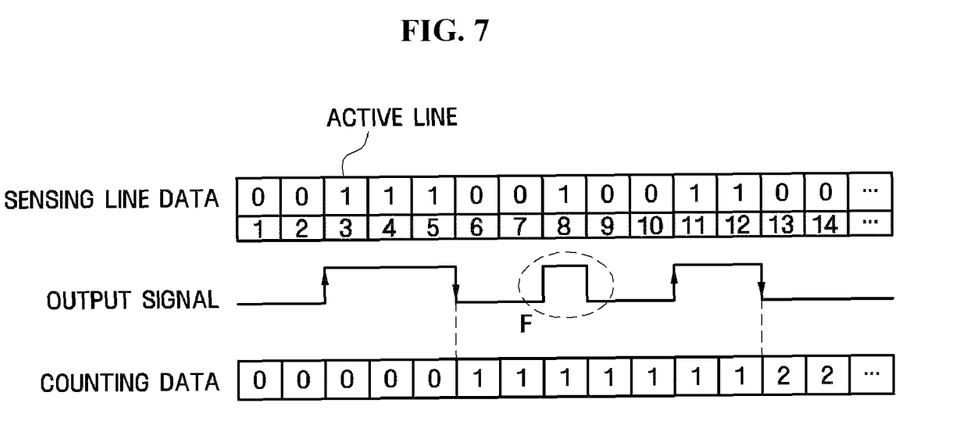
FIG. 7 is a block diagram of a sensing position recognition unit included in the touch position determination unit shown in FIG. 6.
Figure 8A:
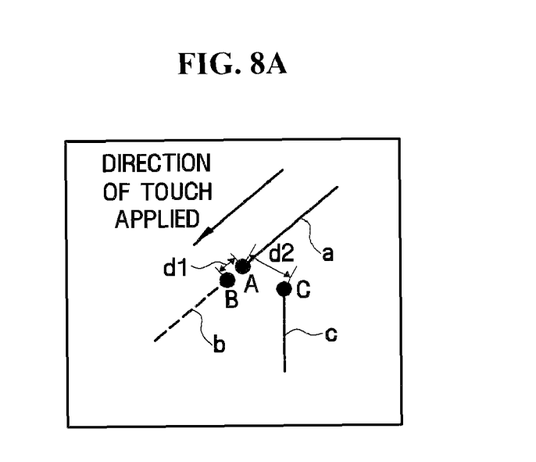
FIG. 8A and FIG. 8B show an actual touch operation and final output result in a touch screen display device according to an exemplary embodiment of the present invention.
Figure 8B:
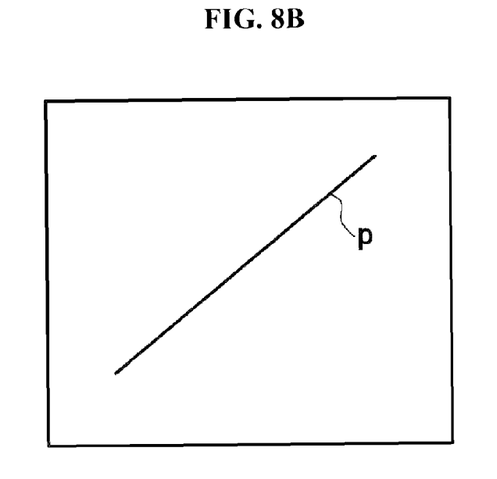

A touch screen display device according to an exemplary embodiment of the present invention and a driving method of the same will now be described in detail with reference to FIG. 6, FIG. 7, FIG. 8A, and FIG. 8B. FIG. 6 is a touch position determination unit included in the touch screen display panel shown in FIG. 1, FIG. 7 is a block diagram of a sensing position recognition unit included in the touch position determination unit shown in FIG. 6, and FIG. 8A and FIG. 8B show an actual touch operation and final output result in a touch screen display device according to an exemplary embodiment of the present invention.

The touch position determination unit 730 includes a sensing position recognition unit 740 recognizing one or more sensing positions of the current frame using the first and second active lines, and a filtering unit 750 filtering one sensing position among the one or more sensing positions of the current frame, the one sensing position that is closest to a touch position TPn-1 of the previous frame as the touch position TPn of the current frame.

The sensing position recognition unit 740 may include a first filtering unit 741, a position value designation unit 742, and a counter 743.

The position value designation unit 742 may designate at least one first position value PVx corresponding to the first active line and at least one second position value PVy corresponding to the second active line. The first and second position values PVx and PVy will be described in more detail below with reference to FIG. 7. The sensing position recognition unit 740 recognizes one or more sensing positions designated by the position value designation unit 742 based on combinations of the first and second position values PVx and PVy.

The counter 743 counts numbers of the at least one first and second position values PVx and PVy, respectively, and transmits the counted numbers to the filtering unit 750.

A method of recognizing the sensing positions will now be described in more detail with reference to FIG. 7. For convenience of explanation, the invention will be described with regard to first sensing lines SLx1-SLxk by way of example. Since the invention may be applied to the second sensing lines SLy1-SLyj in substantially the same manner as the first sensing lines SLx1-SLxk, an explanation thereof will be not be given.

Sensing line data indicating whether or not there is an external stimulus sensed from a plurality of first sensing lines SLx1-SLxk are listed in the upper part of FIG. 7. If there is an external stimulus sensed from the first sensing lines, the sensing line data has a first level, e.g., a voltage level of "1," while if there is no external stimulus sensed from the first sensing lines, the sensing line data has a second level, e.g., a voltage level of "0." Accordingly, if a voltage level is "1," the corresponding sensing line is an active line.

Data listed under the sensing line data are position values corresponding to the respective sensing lines. In FIG. 7, natural numbers gradually increasing according to the order of sensing lines placed are designated as the position values, but are not limited thereto.

The output signal corresponding to the sensing line data is shown in the middle part of FIG. 7. As described above, since the sensing line data is the signal indicating whether there is an external stimulus sensed from the plurality of first sensing lines SLx1-SLxk, the sensing line data corresponds to the first read-out signal ROx. If the sensing line data is in a first level, the output signal has a high level, and while the sensing line data is in a second level, the output signal has a low level.

As shown in FIG. 7, the active lines may be consecutively generated. That is to say, external stimuli may be simultaneously applied to neighboring sensing lines among multiple sensing lines. In the present example, neighboring sensing lines corresponding to position values 3, 4, and 5 may be active lines. Here, a representative position value is designated for the neighboring, consecutive active lines that may be associated with one sensing position.

The read-out unit 700 may designate the number of reference lines for first and second neighboring active lines. In addition, if numbers of first and second neighboring active lines are greater than the number of reference lines, the read-out unit 700 may designate the first or second position value of first or second neighboring active lines as a first or second representative position value. On the other hand, if the numbers of first and second neighboring active lines are equal to or smaller than the number of reference lines, the first or second neighboring active lines may be ignored.

The first and second representative position values may be designated based on two position values corresponding to, among the plurality of first and second sensing lines, sensing lines each having an output signal making a transition from second level to first level or from first level to second level. For example, as shown in FIG. 7, the first representative position value may be a mean value 4.5 ((3+6)/2) of position values 3 and 6, where position value 3 corresponds to the sensing line having an output signal transitioning from second level "0" to first level "1," and position value 6 corresponds to the sensing line having an output signal transitioning from first level "1" to second level "0." The second representative position value may be a mean value 12 ((11+13)/2) of position values 11 and 13, where position value 11 corresponds to the sensing line having an output signal making a transition from second level "0" to first level "1," and position value 13 corresponds to the sensing line having an output signal transitioning from first level "1" back to second level "0."

The lower part of FIG. 7 indicates data output from the counter 743. The counter 743 performs counting operations when transitions are made from high level to low level. That is, the number of position values or representative position values can be counted based on the output signal making level transitions, thereby counting the number of sensing positions.

Referring again to FIG. 6, a filtering unit 750 includes a filtering determination unit 751, a touch position tracking unit 752, and a touch position output unit 753.

The filtering determination unit 751 receives first and second position values PVx and PVy and numbers PNx and PNy of first and second position values, respectively, and determines whether there is any one value among the first and second position values PVx and PVy that may be ignored. That is to say, the filtering determination unit 751 determines whether at least one of the numbers of the first and second position values PNx and PNy is equal to or greater than 2 (two). If both of the numbers PNx and PNy of the first and second position values are equal to 1 (one), the first and second position values PVx and PVy are output to the touch position output unit 753 as touch positions TPn of the current frame.

If the at least one of the numbers PNx and PNy of the first and second position values is equal to or greater than 2, the touch position tracking unit 752 transmits one of the two or more sensing positions corresponding to the first and second position values to the touch position output unit 753. If the number of first position values PVx corresponding to the two or more sensing positions is equal to or greater than 2, the touch position tracking unit 752 compares distances between the two or more first position values PVx and first position values of the touch position of the previous frame, to output the sensing position having a smaller distance to the touch position output unit 753. If the number of second position values PVy for two or more sensing positions is equal to or greater than 2, the touch position tracking unit 752 compares distances between the two or more second position values and second position values of the touch position of the previous frame, to output the sensing position having a smaller distance as the touch position TPn of the current frame.

The touch position output unit 753 may output one sensing position transmitted from the touch position tracking unit 752 or the filtering determination unit 751 as the touch position TPn of the current frame.

The touch position determination unit 730 may further include a touch signal generator 760. The touch signal generator 760, which is enabled responsive to the generated touch position TPn of the current frame, generates a touch signal TE_INT indicating that an external stimulus is applied to the touch screen display panel 300. The touch signal TE_INT may be transmitted to an application (not shown) connected to the touch screen display panel 300. Alternatively, data corresponding to the touch signal TE_INT may be received from the application.

FIG. 8A and FIG. 8B show an actual touch operation and final output result in a touch screen display device according to an exemplary embodiment of the present invention.

In a touch display panel in which a touch is applied in a direction from the right upper side to the left lower side, as shown in FIG. 8A, the line "a" indicates an operation line that has been actually touched, the line "b" indicates an operation line to be touched in a subsequent frame, and the line "c" indicates an operation line that has not been touched but is recognized to have been touched. In the current frame, the lines a, b, and c may contain a position A recognized as the touch position TPn-1 of the previous frame, a position B to be recognized to have been sensed by an actual touch in a subsequent frame, and a position C that has not been touched but is recognized to have been touched.

Here, the touch screen display device according to an exemplary embodiment of the present invention compares a distance d1 between the positions A and B with a distance d2 between the positions A and C, and recognizes the position that is closer to the position A as the touch position TPn of the current frame. The same procedure is repeated on the subsequent frames, and a simulated output line "p" of the actual touch line is obtained, as shown in FIG. 8B.

As described above, in a case where two or more sensing positions are recognized in each frame, the touch position TPn of the current frame can be determined by comparing distances between each of the respective sensing positions and the touch position TPn-1 of the previous frame. Therefore, the sensing position that has not actually been touched but is recognized to have been touched is left out of consideration as the touch position, thereby providing for a touch screen display device having improved reliability.

Figure 9:
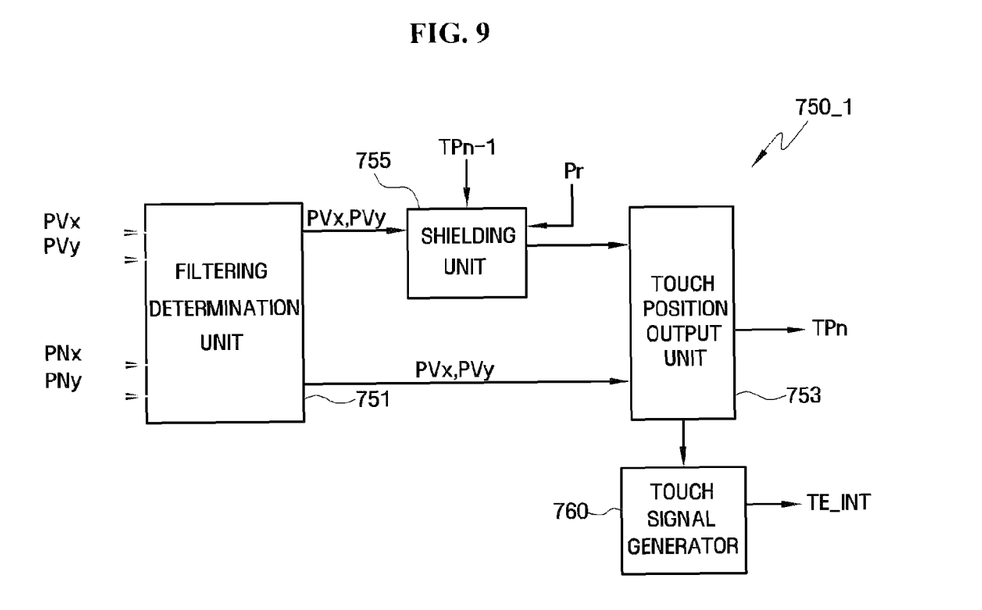
FIG. 9 is a block diagram of a shielding unit included in a touch screen display device according to an exemplary embodiment of the present invention.

Hereinafter, a touch screen display device according to another exemplary embodiment of the present invention and a driving method of the same will be described with reference to FIG. 9. FIG. 9 is a block diagram of shielding unit 755 included in a filtering unit 750_1 of a touch screen display device according to another exemplary embodiment of the present invention.

The touch screen display device according to another exemplary embodiment of the present invention is different from the touch screen display device according to the previous exemplary embodiment in that if a distance between two or more sensing positions is smaller than a reference distance Pr, the two or more sensing positions are ignored.

Referring to FIG. 9, the shielding unit 755 included in the touch screen display device compares a distance between two or more sensing positions with the reference distance Pr, and if the distance between the two or more sensing positions is smaller than the reference distance Pr, the two or more sensing positions are ignored, thereby providing for a touch screen display device having improved reliability.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch screen display device, comprising:
a plurality of sensing lines; and
a read-out unit that receives output signals of the sensing lines, that reads at least one sensing position, and that outputs one of the at least one read sensing position as a touch position,
wherein if the number of the sensing positions of a current frame is equal to or greater than two, only one of the sensing positions is recognized to have been actually touched, and the read-out unit compares the at least two sensing positions of the current frame with a touch position of a previous frame, and outputs the sensing position that is closest to the touch position of the previous frame as the touch position of the current frame, and ignores the other sensing position.

2. The touch screen display device of claim 1, wherein:
the plurality of sensing lines comprises a plurality of first sensing lines and a plurality of second sensing lines;
the plurality of first sensing lines comprises first active lines which correspond to positions of external stimuli;
the plurality of second sensing lines comprises second active lines which correspond to positions of external stimuli; and
the at least one sensing position corresponds to combinations of the first active lines and the second active lines.

3. The touch screen display device of claim 2, wherein the read-out unit designates at least one first position value that corresponds to the first active lines and at least one second position value that corresponds to the second active lines, and reads the at least one sensing position based on combinations of the at least one first position value and the at least one second position value.

4. The touch screen display device of claim 3, wherein the read-out unit counts numbers of the at least one first position value and the at least one second position value, respectively, and outputs the sensing position as the touch position if the counted numbers of the first position value and the second position value are one, respectively, and one of the at least two sensing positions as the touch position if the counted numbers of the first position value and the second position value are equal to or greater than two.

5. The touch screen display device of claim 4, wherein if the number of first position values that correspond to the at least two sensing positions is equal to or greater than two, the read-out unit compares distances between the at least two first position values and the first position value of the touch position of the previous frame, and outputs a sensing position comprising the first position value which is a smaller distance, as the touch position of the current frame, and
if the number of second position values that correspond to the at least two sensing positions is equal to or greater than two, the read-out unit compares distances between the at least two second position values and the second position value of the touch position of the previous frame, and outputs the sensing position comprising the second position value which is a smaller distance as the touch position of the current frame.

6. The touch screen display device of claim 4, wherein if a distance between the at least two sensing positions is smaller than a reference distance, the at least two sensing positions are ignored.

7. The touch screen display device of claim 3, wherein the read-out unit designates the number of reference lines for intervals of first neighboring active lines and second neighboring active lines,
if the interval of the first neighboring active lines or the second neighboring active lines is greater than the number of reference lines, the read-out unit recognizes the at least one sensing position using a first representative position value that represents the first position values of the first neighboring active lines or a second representative position value that represents the second position values of the second neighboring active lines, and
if the interval of the first neighboring active lines and the second neighboring active lines are equal to or smaller than the number of reference lines, the read-out unit ignores the first neighboring active lines and the second neighboring active lines.

8. The touch screen display device of claim 7, wherein
if there is an external stimulus, voltage levels of the first sensing line and the second sensing line are a first level, while if there is no external stimulus, voltage levels of the first sensing line and the second sensing line are a second level,
the first representative position value is a mean value of two of the first position values that correspond to the sensing lines each having an output signal making a transition from the first level to the second level, and an output signal making a transition from the second level to the first level, and
the second representative position value is a mean value of two of the second position values that correspond to the sensing lines each having an output signal making a transition from the first level to the second level and an output signal making a transition from the second level to the first level.

9. The touch screen display device of claim 2, wherein the read-out unit comprises a first sensor unit that senses the first active lines among the plurality of first sensing lines, a second sensor unit the that senses the second active lines among the plurality of second sensing lines, and a touch position determination unit that determines the touch position that corresponds to the first active lines and the second active lines.

10. The touch screen display device of claim 9, wherein the touch position determination unit comprises a sensing position recognition unit that recognizes at least one sensing position of the current frame using the first active lines and the second active lines, and a filtering unit that keeps one sensing position which is closest to a touch position of the previous frame as the sensing position of the current frame, and outputs the sensing position as the touch position of the current frame.

11. The touch screen display device of claim 9, further comprising a touch screen display panel comprising the plurality of sensing lines,
wherein the touch position determination unit comprises a touch signal generator, which is enabled responsive to generation of the touch position of the current frame, wherein the touch signal generator generates a touch signal that indicates that an external stimulus is applied to the touch screen display panel, and transmits the touch signal to an application connected to the touch screen display panel.

12. The touch screen display device of claim 1, further comprising a touch screen display panel comprising the plurality of sensing lines,
wherein the plurality of sensing lines comprises a plurality of first sensing lines and a plurality of second sensing lines, and
wherein the touch screen display panel further comprises a plurality of touch sensing elements respectively arranged at an area where the first sensing lines and the second sensing lines cross each other.

13. A method of driving a touch screen display device comprising a plurality of sensing lines, the method comprising:
receiving output signals of the sensing lines and reading at least one sensing position; and
outputting one of the at least one read sensing position as a touch position,
wherein if there are at least two sensing positions of a current frame, only one of the sensing positions is recognized to have been actually touched by comparing the at least two sensing positions of the current frame with a touch position of a previous frame, and the sensing position of the at least two sensing positions that is closest to the touch position of the previous frame is output as the touch position of the current frame, and the other sensing position is ignored.

14. The method of claim 13, wherein the plurality of sensing lines comprises a plurality of first sensing lines and a plurality of second sensing lines, and wherein among the plurality of first sensing lines, first sensing lines that correspond to positions of external stimuli are first active lines, and among the plurality of second sensing lines, second sensing lines that correspond to positions of external stimuli are second active lines, and the at least one sensing position corresponds to combinations of the first active lines and the second active lines.

15. The method of claim 14, wherein the reading of the at least one sensing position comprises designating at least one first position value that corresponds to the first active lines and at least one second position value that corresponds to the second active lines, and recognizing the at least one first position value based on combinations of the at least one first position value and the at least one second position value.

16. The method of claim 15, wherein the outputting of the touch position of the current frame comprises, defining the number of reference lines for intervals of the first neighboring active lines and second neighboring active lines,
if the interval of the first neighboring active lines or the second neighboring active lines is greater than the number of reference lines, recognizing the at least one sensing position using a first representative position value that represents the first position values of the first neighboring active lines or a second representative position value that represents the second position values of the second neighboring active lines, and
if the interval of the first neighboring active lines and the second neighboring active lines are equal to or smaller than the number of reference lines, ignoring the first neighboring active lines and the second neighboring active lines.

17. The method of claim 15, wherein if the number of first position values that correspond to the at least two sensing positions is equal to or greater than two, distances between the at least two first position values are compared with the first position value of the touch position of the previous frame, and a sensing position comprising the first position value, which is a smaller distance, is output as the touch position of the current frame, and
if the number of second position values that correspond to at least two sensing positions is equal to or greater than two, distances between the at least two second position values are compared with the second position value of the touch position of the previous frame, and the sensing position comprising the second position value, which is a smaller distance, is output as the touch position of the current frame,
wherein if the distance between the at least two sensing positions is smaller than a reference distance, the at least two sensing positions are ignored.

18. The method of claim 15, wherein the touch screen display device comprises a touch screen display panel and wherein, after outputting the touch position of the current frame, the method further comprises generating a touch signal that indicates that an external stimulus is applied to the touch screen display panel and transmitting the touch signal to an application connected to the touch screen display panel.

19. The method of claim 13, wherein the touch screen display device comprises a touch screen display panel,
wherein the plurality of sensing lines comprises a plurality of first sensing lines and a plurality of second sensing lines, and
wherein the touch screen display panel further comprises a plurality of touch sensing elements respectively arranged at an area where the first sensing lines and the second sensing lines cross each other.

* * * * *